June 16, 1942. A. BORZYM Re. 22,114

CUTOFF MECHANISM

Original Filed March 4, 1938 6 Sheets-Sheet 1

INVENTOR.
ALEXANDER BORZYM
By Geo. B. Pitts
ATTORNEY.

June 16, 1942. A. BORZYM Re. 22,114
CUTOFF MECHANISM
Original Filed March 4, 1938 6 Sheets-Sheet 2
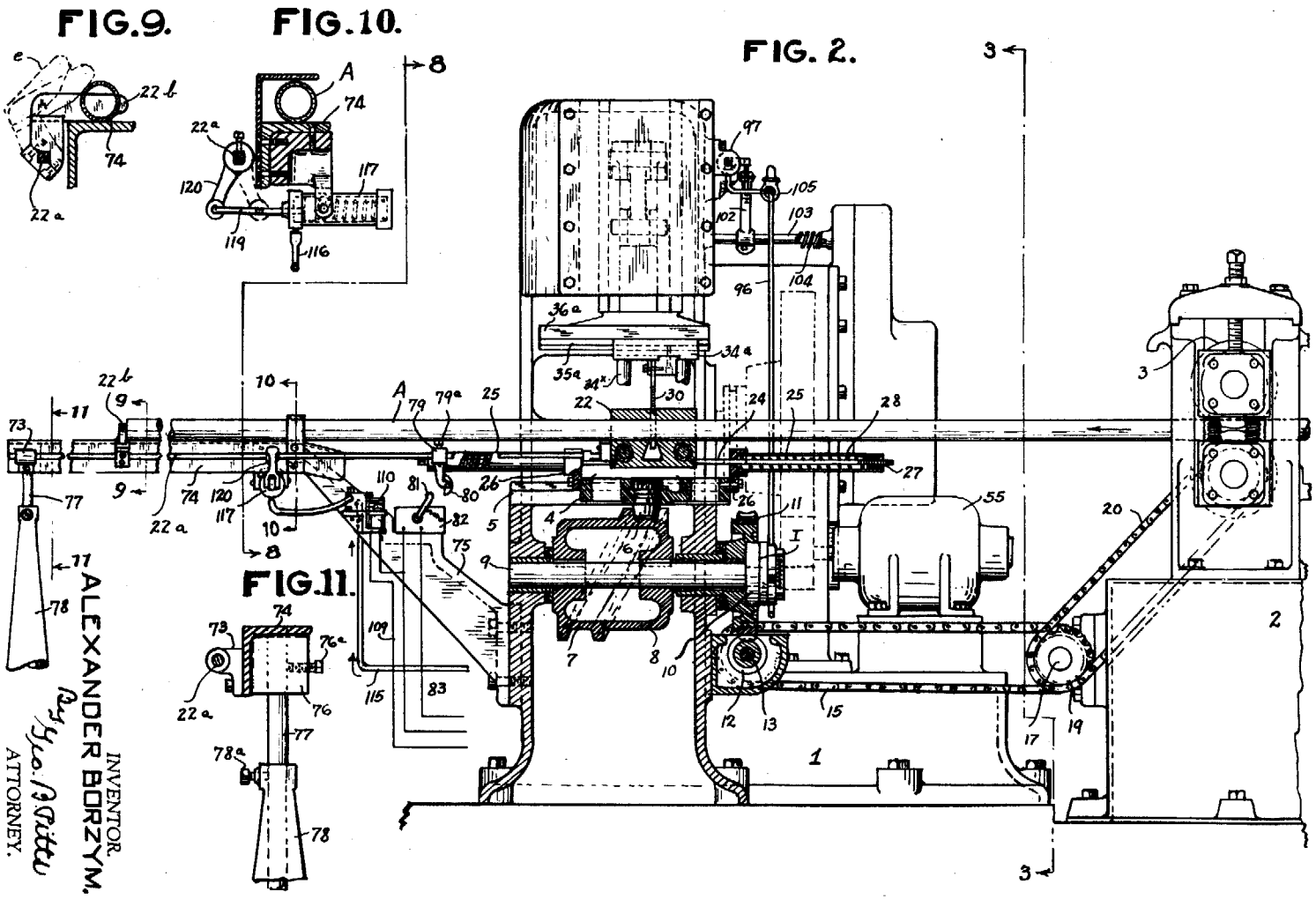
INVENTOR.
ALEXANDER BORZYM.
By Geo. B. Pitts
ATTORNEY.

June 16, 1942. A. BORZYM Re. 22,114

CUTOFF MECHANISM

Original Filed March 4, 1938 6 Sheets-Sheet 3

INVENTOR.
ALEXANDER BORZYM.
BY Geo. A. Pitts
ATTORNEY.

June 16, 1942. A. BORZYM Re. 22,114
CUTOFF MECHANISM
Original Filed March 4, 1938 6 Sheets-Sheet 4
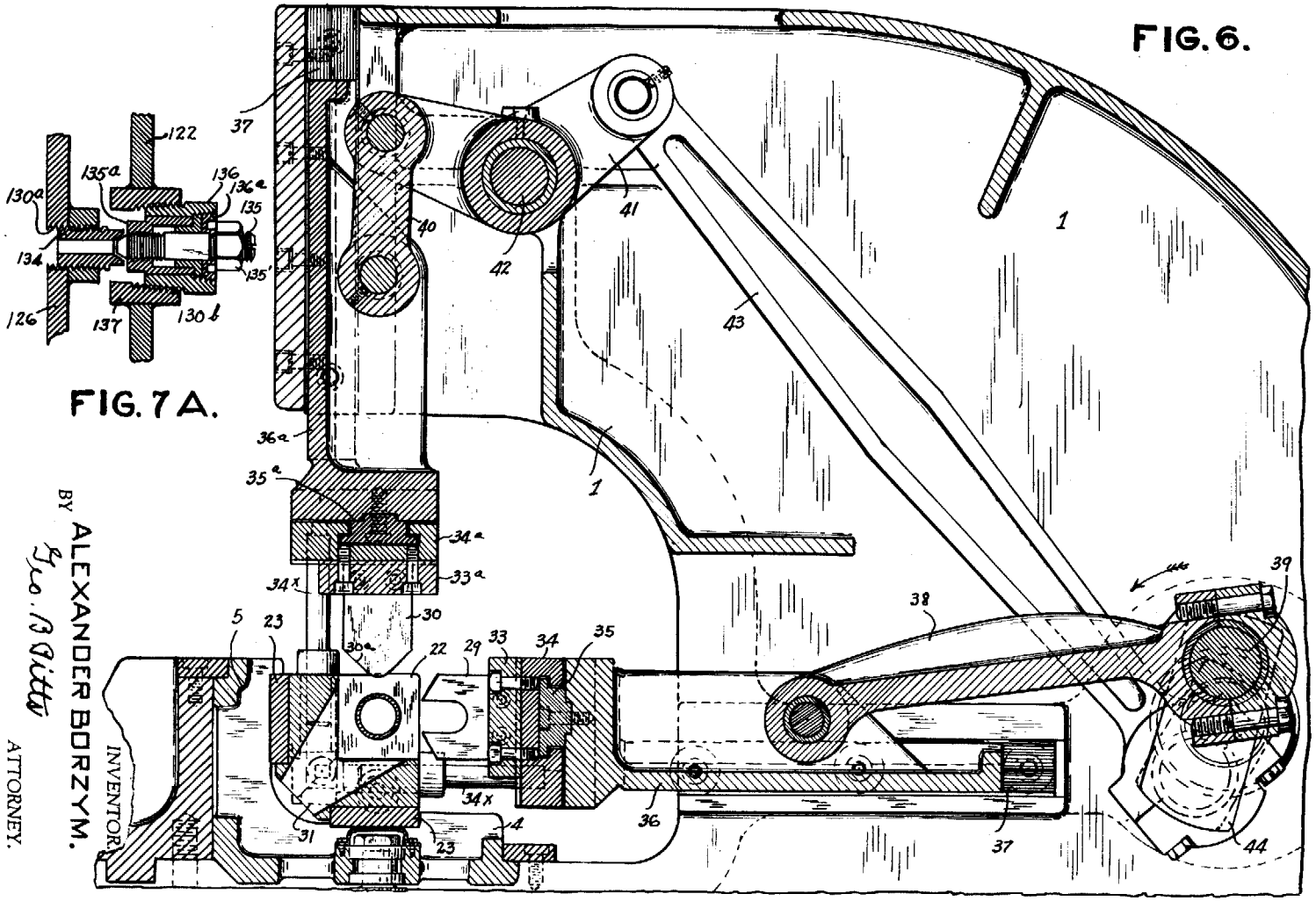
INVENTOR.
BY ALEXANDER BORZYM.
Geo. B Pitts
ATTORNEY.

June 16, 1942. A. BORZYM Re. 22,114

CUTOFF MECHANISM

Original Filed March 4, 1938 6 Sheets-Sheet 5

INVENTOR.
ALEXANDER BORZYM.
BY Geo. B. Ritts
ATTORNEY.

June 16, 1942. A. BORZYM Re. 22,114

CUTOFF MECHANISM

Original Filed March 4, 1938 6 Sheets-Sheet 6

INVENTOR.
ALEXANDER BORZYM.
BY Geo. B. Pitts
ATTORNEY.

Reissued June 16, 1942

Re. 22,114

UNITED STATES PATENT OFFICE 22,114

CUTOFF MECHANISM

Alexander Borzym, Detroit, Mich., assignor to The Yoder Company, Cleveland, Ohio, a corporation of Ohio Original No. 2,205,389, dated June 25, 1940, Serial No. 193,957, March 4, 1938. Application for reissue June 21, 1941, Serial No. 399,219.

32 Claims. (Cl. 164—49)

This invention relates to apparatus for cutting a continuous length of material into sections of uniform length. The particular embodiment of the invention herein shown for purposes of illustration, is adapted for cutting into predetermined lengths hollow bodies which, because of their cross sectional shape or the kind and/or thickness of the material of which they are formed, would be distorted or damaged by the use of a single cutting device. In this application of the invention it is shown as applied to the cutting of metal pipe, the seam of which has been welded but the invention is not to be limited to pipe or hollow bodies formed of metal, nor hollow metal bodies having welded seams.

While I have shown a mechanism employing a plurality of cutters, it is equally applicable to the use of one cutter, for example, for cutting work the cross sectional shape of which is otherwise than hollow; likewise, the invention may be applied to the cutting of work into sections where the latter are shear cut.

One object of the invention is to provide an improved apparatus wherein the cutting of a hollow body into sections may be effected without distorting or damaging the walls thereof.

Another object of the invention is to provide an improved apparatus employing a plurality of cutters co-operatively controlled for making each complete cut of the work.

Another object of the invention is to provide an improved cutoff apparatus employing one or more cutters for each cutting operation, the operation of which is controlled by the work.

Another object of the invention is to provide an improved cutoff apparatus employing a plurality of cutters operable in the same plane for effecting each cutoff of the work.

A further object of the invention is to provide an improved cutoff apparatus of this character adapted to operate on work which is being continuously fed from a source of supply, the cutoff mechanism being controlled by the work and the cutting element or elements being movable with the work to sever the latter independently of the means for operating them.

A further object of the invention is to provide an apparatus of this character wherein separate co-ordinated power means are employed to move the work die and cutter with the work and to operate the cutter.

A further object of the invention is to provide in an apparatus of this character improved means wherein the cutting operation is controlled by the work, the work engaging device and the supports for the cutter or cutters being connected, whereby the work is cut into sections of predetermined, unform length.

A further object of the invention is to provide an apparatus of this character having a cutter operating means, a work die and a cutter in connected relation mounted for movement with the work relative to the cutter operating means.

A further object of the invention is to provide in apparatus of this character, a reciprocating mechanism, a work-die and a cutter in connected relation and means for yieldingly connecting the work-die to the reciprocating mechanism.

A further object of the invention is to provide in apparatus of this character, a reciprocatable work-die and a cutter in connected relation thereto, a device connected to the work-die arranged to be engaged and moved by the work, and means, yieldably connected to the work-die and controlled by said device, for reciprocating the work-die.

A further object of the invention is to provide an improved apparatus of this character wherein shocks and strains incident to the operation of the cutters and re-setting of the operating shaft, on the driving mechanism and other parts are eliminated.

A still further object of the invention is to provide an improved apparatus of this character employing one or more cutters and operable automatically and rapidly, whereby the apparatus has large capacity.

Other objects of the invention will be apparent to those skilled in the art to which my invention relates from the following description taken in connection with the accompanying drawings, wherein Fig. 1 is a view of an apparatus embodying my invention, partly in plan and partly in section on the line 1—1 of Fig. 3.

Fig. 2 is a view, partly in side elevation and partly in section on the line 2—2 of Fig. 3.

Fig. 6 is a fragmentary section on the line 6—6 of Fig. 1, enlarged.

Figures 7, 12:
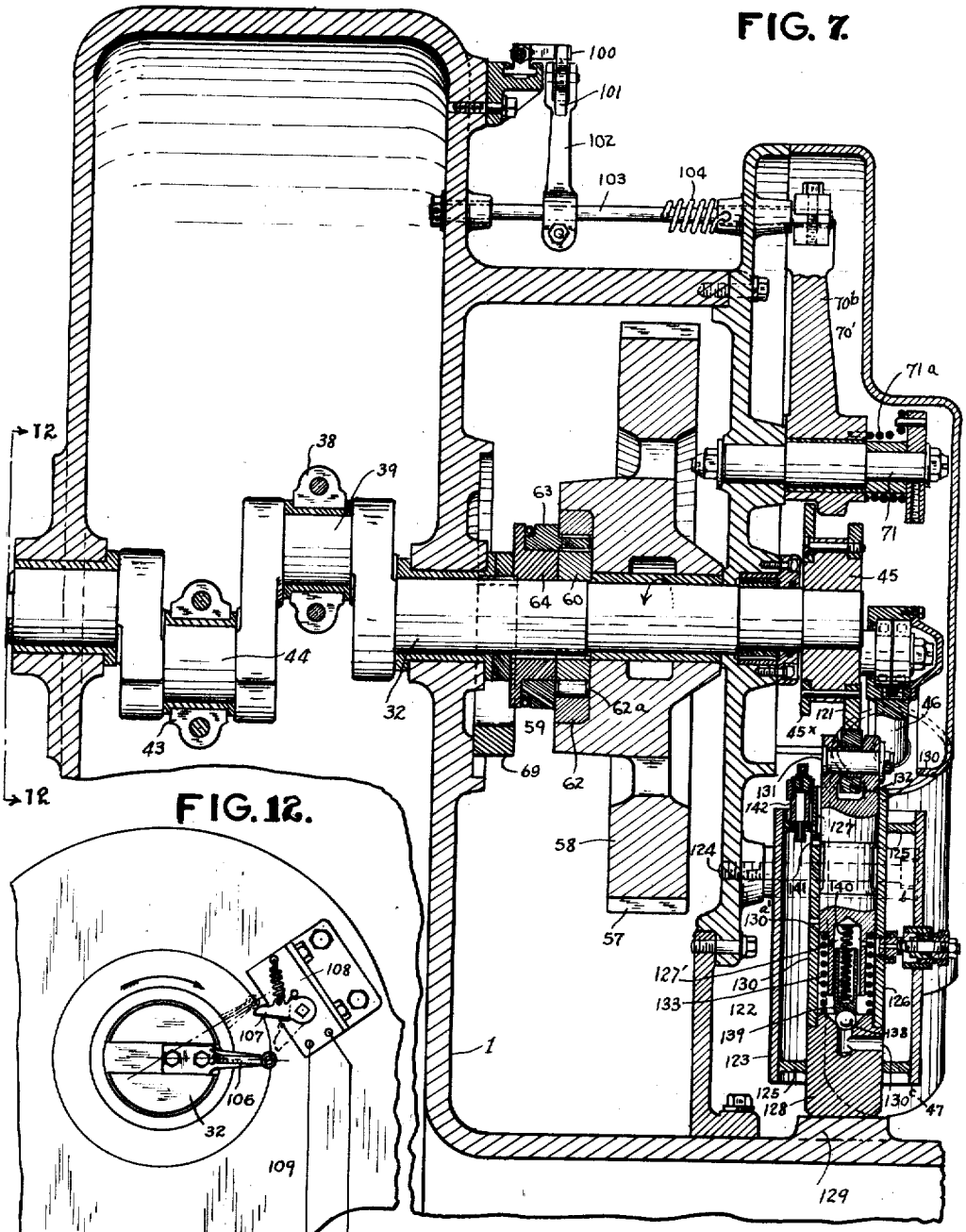
Fig. 7 is a fragmentary section on the line 7—7 of Fig. 3, enlarged.
Figure 7B:
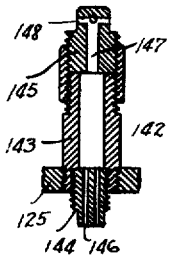

Figs. 7*a* and 7*b* are fragmentary sections of parts shown in Fig. 7, enlarged.

Figure 8:
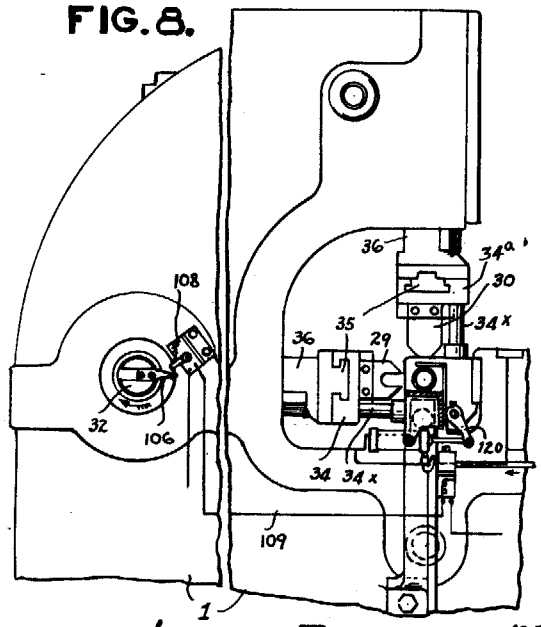

Fig. 8 is a fragmentary section on the line 8—8 of Fig. 2.

Figs. 9, 10 and 11 are sections on the lines 9—9, 10—10 and 11—11, respectively, of Fig. 2.

Fig. 12 is a fragmentary elevation on the line 12—12 of Fig. 7.

Figure 13:
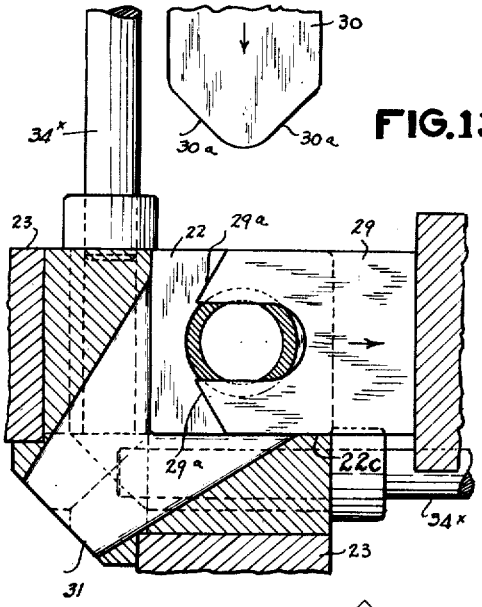

Fig. 13 is a fragmentary view illustrating the relation of the cutters, one thereof being shown in position completing a cut in the work.

Figure 14:
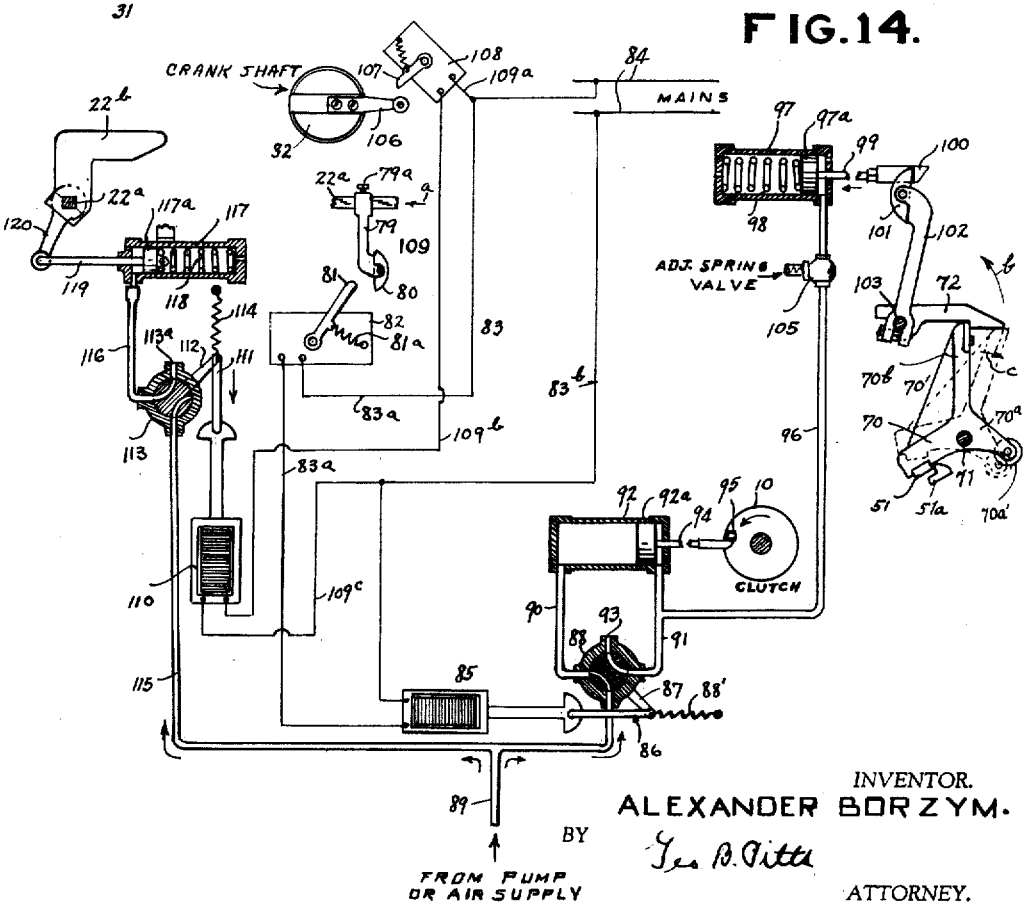

Fig. 14 is a diagrammatic view.

In the drawings, 1 indicates a frame of suitable construction and mounting the mechanisms hereinafter referred to. The frame 1 is arranged adjacent to the delivery end of a suitable tube or pipe forming mechanism (a portion of which is shown at 2), wherein sheet metal is continuously shaped into tubular or pipe form, as shown at A. The mechanism 2 may include a suitable welding means, the pipe then passing between the pair of driven feed rolls 3, which feed the work at a desired speed to the cutoff apparatus. The feed rolls 3 are driven by a power mechanism indicated as an entirety at 3'. The rolls 3 may also serve as sizing rolls for the pipe A if found desirable. In this arrangement, the mechanism for operating a die carrying table (indicated as an entirety at 4) is drivingly connected to the shaft for one of the feed rolls 3, so that the movement of the table may be synchronized with the feed of the work, but the invention is not to be limited to such arrangement, since the pipe A may be supplied in long lengths to the cutoff apparatus, and the power for operating the table, which carries the die with the work, may be otherwise correlated with the supply means.

Figure 1:
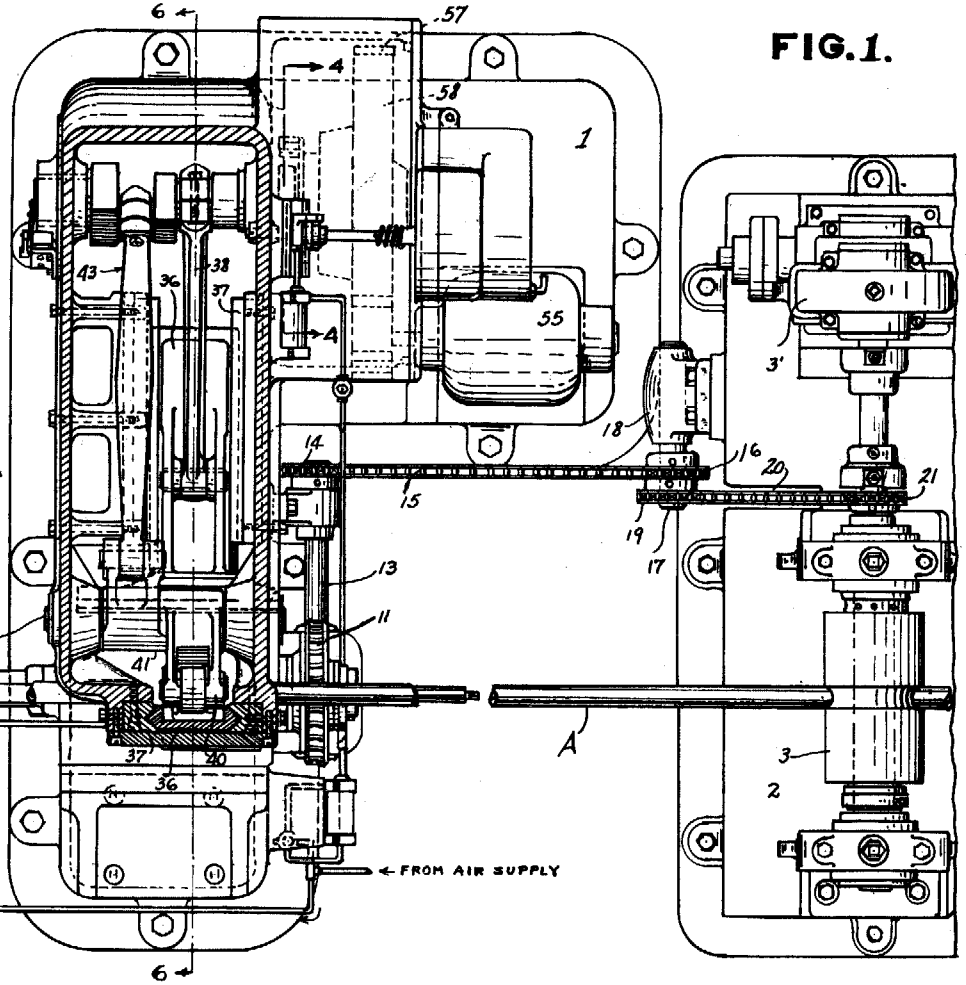

The die carrying table 4 is mounted to reciprocate on guides 5 and is provided with a depending stud shaft on which loosely rotates a roller 6. The roller 6 is arranged to engage a cam track 7 provided on the outer wall of a drum 8, the rotation of which serves to reciprocate the table 4. The drum 8 is fixed to a shaft 9 (see Fig. 2) connected to the driven element of a suitable single revolution clutch 10, which is set in operation as later set forth. The driving element of the clutch 10 has fixed to it a worm gear 11, in mesh with a worm 12, which is fixed to a shaft 13; the shaft 13 is provided with a sprocket 14, which is driven by a chain 15 from a sprocket 16. The sprocket 16 is fixed to a shaft 17, suitably mounted in a bearing bracket on the outer side of the frame for the mechanism 2 and is provided with a second sprocket 19, driven by a chain 20 from a sprocket 21, the latter being fixed to the shaft which drives the lower feed roll 3 (see Figs. 1 and 2). The work die 22 is formed with an opening through which the work extends. The die is removably mounted on the table 4 so that a die having walls corresponding to work having a different cross section may be substituted. The die 22 is provided with ways, which engage guides 23 on the table 4, so as to slide parallelly relative thereto and is also connected to the table, as later set forth, so as to be reciprocated thereby. The die 22 is connected by a rod 22*a* to a flag or device 22*b* arranged to be engaged and moved by the advancing end of the work, to set the clutch 10 and the cutters in operation, so that the die is moved by the flag or device 22*b* with the work in the direction of feed thereof. The mounting and operation of the rod 22*a* and flag 22*b* will be later set forth. As the cutters are operatively connected to the die 22 to move therewith, as later set forth, the adjusted position of the flag 22*b* on the rod 22*a* relative to the cutters determines the length of the sections to be cut, and accordingly the sections will have a predetermined uniform length. The rod 22*a* is rotatably connected to the die, since the rod is rotated as later set forth, to move the flag 22*b* out of the path of movement of the work when the cutters complete each cutoff operation. The die is yieldingly connected to the table by cushioning or spring means which normally tend to hold the die 22 in an intermediate or predetermined normal position, but permit relative movement between the die and table in either direction in line with the feed of the work. These cushioning means serve as the connections between the table 4 and die 22 so that the table moves with the die in one direction, that is, with the work during the cutting operation and both are moved in the opposite direction to position the die and flag in position for the succeeding cutoff operation. The cushioning means permit the die to move relative to the table when moving with the work and relieve strains on the cutters at the time the table reaches the end of its movement in the forward direction and starts to move in the rearward direction. Also, since the flag 22*b* is connected by the rod 22*a* to the die and moves the latter with the work and the cutters are also in fixed relation to the die, as later set forth, the cushioning means automatically compensate for the movement of the flag 22*b* and rod 22*a* in setting the table reciprocating mechanism and cutter operating means in operation. Thus the table reciprocating mechanism supplements the operation of the flag 22*b* while engaged by the advancing work and during the operation of the cutters to move the die and cutters forwardly, but serves to move these parts back to starting position ready to effect the succeeding cutting operation. The cushioning means are arranged in front and rearward of the die 22 and co-act to normally maintain it in a predetermined relation to the table. Each cushioning means comprises a rod 24 connected at its inner end to the die (being preferably threaded into an opening formed therein). The outer end portion of the rod 24 extends through a cylinder 25, suitably supported at its inner end on a bracket 26 carried by the adjacent end of the table 4. At its outer end the rod 24 is provided with screw threads to adjustably support a collar 27, which slidably fits the inner wall of the cylinder 25. A coiled spring 28 mounted in the cylinder 25 and abutting the collar 27 and bracket 26 normally tends to slide the die toward the latter. The cushioning means are arranged at and connected to the opposite ends of the die so that the springs 28 normally act in opposition to each other, but permit movement of the die in either direction relative to the table 4. As shown in Figs. 2, 6 and 13, the die 22 is formed with a transverse slot 22*c* into which the cutters indicated at 29, 30, project to cut the work, one slot only being required as both of the cutters operate in the same transverse plane. In this arrangement a portion of the work, after a section thereof is cut off, is mounted in the die ready to feed forwardly. The slot 22*c* is connected to a discharge chute 31 through which the slugs resulting from the cuts may gravitate. Where the work has a cross sectional shape other than round, either cutter may be employed, the other cutter being removed. Also, where a shear cut is desired, a suitable die is employed and one of the cutter carrying members may be provided with a co-acting shearing device.

Where two cutters are employed, they operate in planes at angles to each other, preferably at right angles, the cutters being driven from a single shaft 32 and controlled, as later set forth, so that one makes its cut and moves away from the work in advance of the cutting stroke of the other cutter. One cutter, for example, cutter 29, consists of two spaced cutting edges 29*a*, so as to engage and cut through the opposite side portions of the work, as shown in Fig. 13, whereas the other cutter 30 consists of two converging cutting edges 30*a* which project into the work through the slot cut by the adjacent cutting edge 29*a* and cut through the remaining walls thereof in line with the cuts made by the cutter 29. The cutter 29 is secured to a plate 33, which is removably bolted to a block 34. The block 34 slidably engages a guide 35, disposed parallel to the direction in which the work A and table 4 move and is fixed to a reciprocatable slide 36. The cutter 30 is secured to a plate 33*a*, which is removably bolted to a block 34*a*. The block 34*a* slidably engages a guide 35*a* disposed parallel to the direction in which the work A and table 4 move and is fixed to a reciprocatable slide 36*a*. The cutter which cuts the opposite side portions of the work is illustrated as moving horizontally, but it may be arranged to operate in any direction. Each slide 36, 36*a*, is mounted in ways 37 provided on the frame 1, as shown in Fig. 6. The slide 36 is connected by a rod or pitman 38 to one crank 39 on the shaft 32. The slide 36*a* is connected by a link 40 to one arm of a bell-crank 41, mounted to rock on a shaft 42 carried by the frame 1, the other arm of the bell-crank being connected by a rod or pitman 43 to a separate crank 44 on the shaft 32. The shaft 32 is mounted in suitable bearings provided in spaced walls of the frame 1, as shown in Fig. 7.

The arrangement for slidably mounting the cutters on the slides 36, 36*a*, provides for movement of the cutters 29, 30, with the die and work A during the reciprocations of the cutters in making a cutting operation. To effect such movement, the supporting blocks 34, 34*a*, for the cutters 29, 30, are connected to the die, so as to reciprocate therewith, by means of pilot pins 34*x*. For this purpose each block 34, 34*a*, is provided with two pilot pins 34*x* which slidably fit openings 22*x* formed in the die 22. As shown in Fig. 6, the pilot pins 34*x* extend to points in advance of the cutters 29, 30, so that in the movement of the slides 36, 36*a*, in their movement to effect the cutting strokes of the cutters, the pilot pins have sliding engagement with the walls of the openings 22*x* to permit operations of the cutters to and from the die and work while maintaining them and the die in fixed relation; in other words, the cutters are reciprocated at right angles to the work by the shaft 32 and linkage above described and by reason of the connections between the die 22 and blocks 34, 34*a*, provided by the pilot pins 34*x* slidably fitting the openings 22*x*, the die serves to move the cutters with the work in the forward direction and back again.

As later set forth, the shaft 32 makes one revolution for each cutting operation; that is, operation of both cutters 29, 30, in sequence to cut a section of the work A. The shaft 32 is arranged to be locked in a predetermined position against rotation with both of the cutters 29, 30, in their retracted positions, as shown in Fig. 6. When in this position, the shaft 32 is connected to a spring power mechanism, the spring of which is under compression or tension, so that upon operation of a locking element, the shaft is initially driven by the spring operated power mechanism, following which, by means of a clutch mechanism, the shaft 32 is connected to a separate or main power mechanism which initially supplements the power of the spring power mechanism, and then continues to drive the shaft 32 to complete the cutting operation and to re-compress the spring of the spring power mechanism. The separate power mechanism is then disconnected from the shaft 32 and the latter is relocked with the spring of the spring power mechanism re-set and compressed ready for the next cutting operation. To insure the cutting stroke of the cutter 29 in advance of the cutting stroke of the cutter 30, the cranks 39, 44, have a predetermined relation as shown in Fig. 6 and the rod or pitman 43 operates the cutter 30 through the bell-crank 41, so that the cutting stroke of the cutter 30 takes place simultaneously with and during the retraction of the cutter 29.

The spring power mechanism comprises the following: 45 indicates a crank disk on one end of the shaft 32 (see Figs. 3 and 7), to which is connected a thrust rod 46 extending into a cylinder 47 and carrying at its outer end a collar or head 48. Fixedly mounted in the cylinder 47 at its inner end is a collar 49 between which and the head 48 is interposed a coiled spring 50, shown in compressed condition in Fig. 3 and arranged to act on the head 48 and through it and the rod 46 to start rotation of the shaft 32, as already set forth, upon release of the locking element, indicated at 51. The outer end portion of the cylinder 47 is mounted in a ring 52, which is pivotally mounted between a pair of arms 53 formed integrally with a bracket 54, the latter being fixed to the adjacent portion of the frame 1 (see Fig. 3). A tube 50*a* fits within and extends longitudinally of the spring 50 to keep the latter from buckling when compressed. As the thrust rod 46 is connected to the crank 45, it will be seen that when the latter rotates to the position shown in Fig. 3 the spring 50 is compressed so as to exert its influence to rotate the shaft 32, upon operation of the locking element 51.

Figure 5:
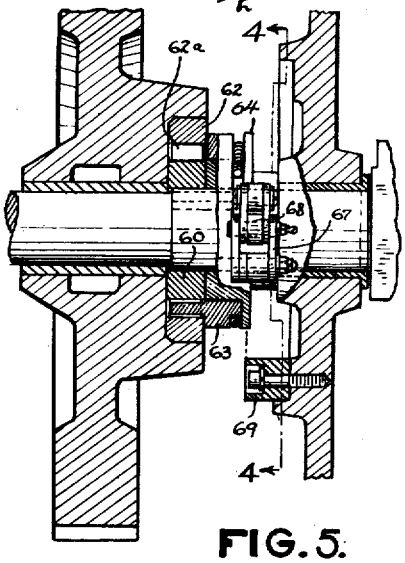
Fig. 5 is a section on the line 5—5 of Fig. 4.
Figure 4:
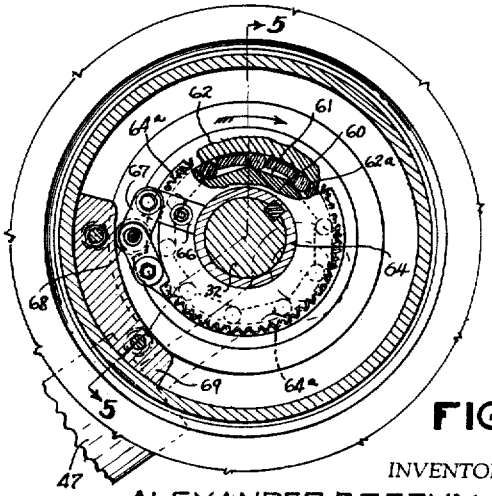
Fig. 4 is a section on the line 4—4 of Figs. 1 and 5.

The main or motor driven power mechanism for rotating the shaft 32 comprises the following: 55 indicates a continuously driven motor, the shaft thereof carrying a pinion 56 in mesh with the teeth 57 on a fly-wheel 58 loosely mounted on the shaft 32, but arranged to be connected thereto and disconnected therefrom by means of a clutch, indicated as an entirety at 59 (see Fig. 7) and shown in detail in Figs. 4 and 5. The clutch 59 consists of an inner member 60 suitably keyed to the shaft 32 and formed with a plurality of cam walls 61, an outer annular member 62 fixed to the hub of the fly-wheel 58, a plurality of rollers 62*a*, one for each cam wall, interposed between these walls and the annular member 62 and held in spaced relation by a cage 63, and a collar 64 keyed on the shaft 32 and connected to the cage 63 by a plurality of springs 64*a* normally tending to rotate the cage 63 in a direction (clockwise as viewed in Fig. 4—see arrow) to move the rollers 62*a* up the cam walls 61, to lock them between the inner member 60 and the outer member 62, the effect of which is to connect the fly-wheel 58 to the shaft 32. The collar 64 is provided with an arm 66 (see Fig. 4), the outer end of which is connected to the cage 63 by a pair of pivotally connected links 67, operable as a toggle, which links are articulated under the influence of the springs 64*a* to swing their connected ends outwardly, whereby a roller 68 (carried by the pintle which connects the links together) is normally disposed in the path of a cam or operating member 69 fixed to the adjacent wall 1a of the frame 1, by bolts, as shown in Figs. 4 and 5 and arranged to engage therewith as the shaft 32 rotates. As shown in Fig. 4, when the roller 68 engages the member 69, the latter causes the links to expand, the effect of which is to move the cage 63 counterclockwise (as viewed in Fig. 4) against the tension of the springs 64a and thus move the rollers 62a to the low sides of the cam walls 61, thereby releasing the fly-wheel 58 from the shaft 32. When roller 68 and the links 67 move beyond the end of the member 69, the cage, under the influence of the springs 64a, will move clockwise to effect engagement of the rollers 62a with and between the high sides of the cam walls 61 and outer clutch member 62, to connect the shaft to the fly wheel 58. In this operation, the inner or connected ends of the links 67 will swing outwardly.

Fig. 4 shows the position of the clutch elements when the shaft 32 is in set position and locked against movement by the element 51, as shown in Figs. 1, 2, 3, 6 and 7. Upon operation of the element 51, the spring power mechanism will rotate the shaft 32, which in turn, through the arm 66, will move the links 67 beyond the end of the member 69 and permit the clutch to automatically connect the separate or main power mechanism, that is, the driven fly-wheel 58, to the shaft 32. The shaft 32 will then be driven by the main power mechanism to effect the cutting operation, as already described. In the revolving movement of the clutch, the links 67 will engage the member 69, which will expand the links 67, and through the cage 63 move the rollers 62a to the low sides of the cam walls 61 and thus release the clutch element 62 from the clutch element 60. As will be understood, the member 69 is arranged to operate the clutch to disengage the fly-wheel 58 from the shaft 32 after the spring 50 has been re-set and prior to the locking of the shaft 32 by the locking element 51, the operation and control of which is later set forth.

Figure 3:
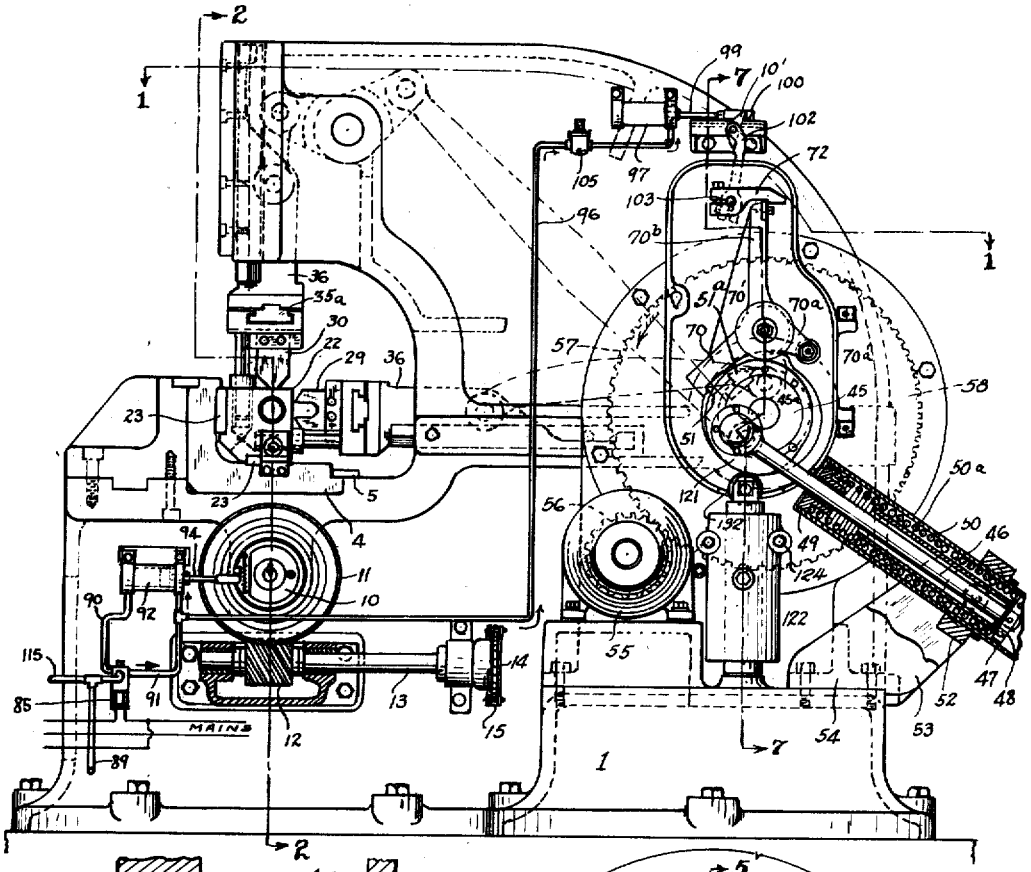
Fig. 3 is a section on the line 3—3 of Fig. 2; a portion being on the line 3*a*—3*a* of Fig. 2.

The locking element 51 is mounted on one arm 70 of a rocker 70' which is mounted to rock on a shaft 71 suitably supported in the frame 1. The shaft 71 is surrounded by a coiled spring 71a (see Fig. 7) arranged to normally bias the rocker 70' to the position shown in dotted lines in Fig. 14, in which position another arm 70a of the rocker 70' rides on the outer wall of the crank 45, for a purpose later set forth. By preference, the outer end of the arm 70a is provided with a roller 70a' to reduce the friction between the arm and crank. The rocker 70' is shown in Figs. 3 and 14 in operative position, that is, with the locking element 51 in engagement with a lug 51a on the crank 45 and operating therethrough to prevent rotation of the shaft 32 under the influence of the spring 50. The crank 45 is provided on its side wall with a knocker 45a which, in the rotative movement of the crank, engages the roller 70a' and throws the rocker 70 counterclockwise, as viewed in Figs. 3 and 14, whereby a third arm 70b of the rocker 70' is locked by a trip 72 (to be later referred to) with the locking device 51 in the path of movement of the lug 51a, the engagement of the latter with the device 51 serving to stop the shaft 32 and lock it against movement, until the rocker 70' is again released by the trip 72.

As already stated the advancing end of the work A controls the operation of the cutters by engagement with the flag 22b, which in turn slides the rod 22a endwise. The flag 22b is adjustable longitudinally of the rod 22a so as to position it at the desired predetermined distance from the plane in which the cutter 29 starts to cut the work, which distance determines the length of each cut-off section. The outer end of the rod 22a extends through and is slidably and rotatably supported in a bracket 73 fixed to the vertical side of an angle 74, the horizontal side of which serves as a support for the outer end portion of the work as it moves forward. The inner end of the angle 74 is fixed to a bracket 75, preferably mounted on the frame 1 (see Fig. 2), and its outer end is provided with a block 76 which is formed with an opening arranged to receive the upper end of a rod 77, the latter in turn being adjustably mounted in a standard 78, by means of a set screw 78a. The block 76 may be secured to the rod 77 by a set screw 76a. 79 indicates an arm adjustably fixed to the rod 22a by a set screw 79a and carrying on its free end a striker 80, which, in the forward movement of the rod (as indicated by the arrow a in Fig. 14) engages with and swings the arm 81 of an electric switch 82 to close an electric circuit 83. The arm 81 is normally biased to switch-open position by a spring 81a, so that upon operation of the arm by the striker 80, which is arranged to ride the arm after operation thereof, it returns to its first position to open the circuit 83. The striker 80 is pivoted on the arm 79 so as to be free to swing in a clockwise direction, as viewed in Fig. 2, whereby it is free to ride the arm 81 in the return movement of the rod 22a. The circuit 83 comprises leads 83a, 83a, 83b, connected to mains 84, and when the switch 82 is closed, supplies current to, and energizes the coil of a solenoid 85, the core of which is connected by a link 86 to the arm 87 of a two-way valve 88, and serves to operate the valve element of the valve 88 a quarter turn. The link 86 is connected to a spring 88' which normally tends to draw the core outwardly, when the solenoid coil is de-energized and return the valve element to normal position, as shown in Fig. 14. 89 indicates a conduit leading from a suitable source of air supply under pressure and connected to one side the casing of the valve 88. 90, 91, indicate conduits leading from the valve casing for the valve 88 and connected to the opposite ends of a cylinder 92, so as to control a piston 92a therein. As shown in Fig. 14, the valve element of the valve 88 is provided with two ducts, and when the valve element is in normal position (see Fig. 14), one duct connects the conduit 89 with the conduit 90 so that the air pressure maintains the piston 92a at the inner end of the cylinder 92 and the other duct connects the conduit 91 with a bleeder port 93. When the valve element is operated a quarter turn, as already described, the ducts effect connection of the conduit 90 with the bleeder port 93 and the conduit 89 with the conduit 91, so that air pressure is admitted to the opposite side of the piston 92a to force it toward the outer or left hand end of the cylinder 92. The piston 92a is connected to a rod 94 the free end of which is arranged to be engaged by a lug 95 on the control member of the one-revolution clutch 10 to prevent operation of the latter, but upon movement of the piston 92a toward the outer end of the cylinder 92, the rod 94 disengages the lug 95 and permits operation of the clutch 10, which in turn rotates the drum 8 one revolution to reciprocate the table 4, as already described. As the valve element of the valve 88 is returned to normal position upon de-energization of the coil of the solenoid 85, the piston 92a is returned to the inner end of the cylinder 92 so as to position the rod 94 in the path of movement of the lug 95, whereby the clutch 10 is stopped after making one revolution. 96 indicates a conduit connected to the conduit 91 for supplying air under pressure to the inner end of a cylinder 97 and arranged to force a piston 97a therein toward its outer end. By preference, the piston 97a is normally biased toward its inner end by an expansion spring 98 interposed between the piston and outer end of the cylinder. A rod 99 is connected to the piston 97a and carries at its outer end a shoulder 100, which engages a dog 101 pivoted on the free end of an arm 102, fixed to a rock shaft 103. As will be understood from the foregoing description, the operation of the piston 97a toward its outer end will move the rod 99 endwise and the rod in turn, through the shoulder 100, dog 101 and arm 102, will rock the shaft 103, as indicated by the arrow *b* (Fig. 14). As the shaft 103 carries the trip 72, rocking thereof will permit the trip 72 to release the rocker 70', permitting the latter to swing about the shaft 71 under the influence of the spring 71a, as indicated by the arrow *c*. In such movement of the rocker, the locking element 51 will disengage the lug 51a, and permit the shaft 32 to be rotated under the influence of the spring 50. The dog 101 is pivoted on the arm 102 so that in the event it rides the shoulder 100 in the active stroke of the rod 99, the shoulder may freely ride the dog in its return movement under the influence of the spring 98 to position the shoulder in operative position forward of the dog, as shown in Fig. 14. The shaft 103 is surrounded by a coil spring 104 (see Fig. 7), one end of which is suitably fixed and its other end is connected to the shaft 103 and normally tends to rock the latter clockwise, as viewed in Fig. 14, so that following the operation of the arm 102 and trip 72 to release the rocker 70', the trip will be returned to its normal position ready to engage the arm 70b when the rocker 70' is operated counter-clockwise by the engagement of the lug or knocker 45a with the rocker arm 70a, as already described.

It is desirable to start the rotation of the shaft 9 slightly in advance of the starting of the shaft 32, so that while I have provided a valve 88 which supplies the air pressure to both cylinders 92 and 97, I provide control means for retarding the operation of the piston 97a in the cylinder 97, so that the release of the device 51 from the lug or catch 51a takes place after the clutch 10 has been set in operation. The control means herein provided consists of a pressure valve 105 in the conduit 96 having a spring operated valve element which opens upon establishing a predetermined pressure in the conduit, the valve being provided with means for adjusting the tension of the spring to control the valve, whereby the operation of the piston 97a is co-ordinated with the operation of the piston 92a. By reason of this arrangement, the pressure is first built up in the cylinder 92 to operate the piston 92a outwardly and effect release of the clutch 10 in advance of the operation of the valve 105 and supply of pressure to the cylinder 97.

Provision is made for swinging the flag 22b laterally out of the path of movement of the work A at or immediately following the time the cutter 30 completes its cutting stroke, and back again, so that the flag 22b may be positioned for engagement by the advancing end of the work, it being noted that the flag 22b is retracted to its starting position by the rearward movement of the die 22 through the connection of the latter with the table 4. By preference, the flag 22b, in its swinging movement back to its position in the path of movement of the work, is utilized as the means for discharging the cutoff section of the work from the support 74. For carrying out these operations, I provide on the outer end of the shaft 32 a tappet 106 (see Figs. 8, 12 and 14), which is arranged to engage and operate the spring operated arm 107 of a normally open switch 108 to close an electric circuit 109 (see Figs. 12 and 14). The closing of the circuit 109 energizes the coil of a solenoid 110, the core of which is connected through a link 111 to the crank or arm 112 fixed to the rotary valve element of a valve 113, a spring 114 being connected to the arm 112 to rotate the valve to closed or normal position upon de-energization of the solenoid coil. 115 indicates a conduit for air under pressure connected to the air supply conduit 89 and arranged to supply air to a conduit 116, when the valve element of the valve 113 is rotated a predetermined distance, as will be understood from Fig. 14. The valve element of the valve 113 is formed with two ducts and (*a*) when this element is in normal position the air supply from the conduit 115 is cut off and the conduit 116 is connected by one duct to a bleeder port 113a, as shown in Fig. 14, and (*b*) when this element is rotated a quarter turn, the other duct connects the conduit 115 to the conduit 116. The conduit 116 is connected to the inner end of a cylinder 117 having a piston 117a which is normally biased toward the inner end thereof by a spring 118 interposed between the piston and the outer end of the cylinder 117. The piston 117a is connected to a rod 119, the outer end of which is pivotally connected to an arm 120 non-rotatively connected to the rod 22a. Accordingly, when air is admitted to the cylinder 117, the piston 117a will be moved toward its outer end and through the rod 119 and arm 120 it will rotate the rod 22a and swing the flag 22b to the position *e* (see dotted lines in Fig. 9), out of the path of movement of the work A. As soon as the coil of the solenoid 110 is de-energized, the valve element of the valve 113 will be returned to normal position, shutting off the supply of air to the cylinder 117, thereby permitting the piston 117a to return to the inner end of the cylinder under the influence of the spring 118, the port 113a in the casing of the valve 113 serving as a bleeder for the cylinder. This operation of the piston 117a will return the flag 22b to its first position in the path of movement of the advancing end of the work and in such movement the flag will engage the cutoff section of the work and automatically discharge it from the support 74.

The circuit 109 consists of a lead 109a connecting one terminal of the switch 108 with one of the leads 83a, a lead 109b connecting the other terminal of the switch with one end of the coil of the solenoid 110 and a lead 109c connecting the other end of the solenoid coil with the lead 83b. The tappet 106 extends radially from the shaft 32 and is arranged angularly thereon in position to engage the switch arm 107 at the time the lug 51a is approaching the locking device 51, so as to co-ordinate the movement of the flag 22b at the time of or immediately following the cutting stroke of the cutter 30.

Means are preferably provided for retarding the rotation of the shaft 32 following each cutting operation and at the time the lug or catch 51*a* carried by the crank 45 or ring 45*x* is approaching the releasing device 51, whereby strains on the parts which become engaged and through them to other parts of the apparatus, are minimized. The retarding means consists of a cam 121 preferably fixed to the crank 45 (see Figs. 3 and 7) and a resistance mechanism, indicated as an entirety at 122, arranged to oppose the throw of the cam 121, and operate therethrough to retard the rotation of the shaft 32. Of the mechanism 122, 123 indicates a reservoir or surge tank for a fluid such as oil. The tank 122 is preferably of cylindrical shape, secured by bolts 124 to the adjacent wall of the frame 1, and provided with upper and lower annular walls 125, in and through which extends a cylinder 126 for a piston 127. The cylinder 126 comprises a block 128 suitably secured to the lower wall 125 and extending therethrough for engagement with a pad 129 and a tube 130 suitably secured to the upper wall 125 and extending therethrough, the lower end of the tube 130 being connected in a liquid tight manner to the upper end of the block 128. The upper end of the piston 127 is bifurcated to support the opposite ends of a shaft 131 on which is loosely mounted between the bifurcations a roller 132 to engage the cam 121. The lower end of the piston 127 is reduced to accommodate a relatively strong, coiled expansion spring 133 which is interposed between the block 128 and the shoulder formed by the reduced portion and which normally tends to move the piston upwardly, whereby the roller 132 is maintained in engagement with the cam 121 as the latter rotates. To provide for the transfer of oil from the tube 130 below the piston 127 to and from the reservoir 123, I provide a threaded opening 130*a*, which is formed in the side wall of the tube 130, having a metering valve 130*b* and a valved conduit 130*c* leading into the inner end of the tube 130, one element of the metering valve being mounted in the threaded opening 130*a*. The metering valve 130*b* comprises a seat member 134 externally threaded and mounted at its inner end in the opening 130*a*, the opening through the seat member serving as a discharge opening for the oil in the cylinder 126 following the initial downward movement of the piston 127 (when the latter is actuated by the cam 121) and as an inlet opening for the oil, in the final portion of the piston movement upwardly, whereby oil may be drawn into the cylinder 126. The rate of flow of the oil through the discharge opening and seat member 134 is controlled by a plunger 135 adjustable toward and from the outer end of the latter, so as to regulate the resistance to the piston in its downward movement. The plunger 135 is preferably threaded externally to provide screw threaded engagement with a bushing 135*a* suitably fixed within a sleeve 136, the inner end portion of which has screw threaded engagement with a collar 137 fixedly mounted in the side wall of the reservoir. Suitable packing is mounted in the sleeve and compressed against the outer end of the bushing by a disk 136*a* having screw threaded engagement with the outer end of the sleeve 136. The outer end of the plunger 135 is formed with a kerf, whereby, by means of a suitable tool, the plunger 135 may be rotated, the effect of which is to adjust its inner end relative to the outer port of the discharge opening through the seat member 134. A nut 135' is employed to lock the plunger in adjusted position. The return conduit 130*c* extends through the block 128, its inner end being shaped to form a seat for a valve element 138 (preferably a ball) arranged to close the conduit in the downward movement of the piston 127, but arranged to be unseated and permit in-flow of the oil in the upward movement of the piston. By preference, the valve element 138 is engaged by a thrust member 139 which is normally pressed toward the valve element by a suitable spring 140. To provide for this arrangement, the piston 127 is formed with a recess 127' extending inwardly from its lower end, the wall of the recess serving as a guide for the thrust member 139 and the latter is formed with a recess extending inwardly from its upper end, the spring 140 being interposed between the end wall of the recess in the thrust member and the end wall of the recess in the piston. As will be understood, the spring 140 is relatively weak to avoid undue pressure on the valve element 138 to permit ready operation thereof away from its seat in the upward movement of the piston 127. The lower portion of the piston 127 is provided with bleed ports leading from the recess 127' to prevent pocketing of oil therein. The upper end portion of the tube 130 is formed with an opening 141 to permit escape of any oil carried up with the piston. In the initial movement of the piston downwardly, it first forces oil in the cylinder 126 out through a port 130*a'* formed in the side wall of the tube 130 and then closes the port so that in continued movement of the piston the oil is discharged through the metering valve the effect of which is to retard the piston travel. The upper wall 125 is provided with a device, indicated as an entirety at 142 (see Fig. 7*b*), to permit intake and exhaust of air from the reservoir above the oil level therein to compensate for the rise and fall of the oil level due to operation of the piston 127. The device 142 is constructed to prevent the escape of oil incident to the operation of the piston 127 downwardly. The device 142 comprises a section of pipe 143 (see Fig. 7*b*) suitably mounted in an opening formed in the upper wall 125 and having mounted in its inner and outer ends threaded plugs 144, 145. The plug 144 is provided with one or more small openings 146 through it, whereas the plug 145 is formed with a longitudinal duct 147 connected at its upper end to one or more horizontal ducts 148 opening through the side walls of the plug head. In this arrangement, the pipe 143 provides a chamber somewhat larger than the openings 146 through the plug 144, so that the force of the air and any oil carried along with the air, is broken down, whereas by forming in the plug 145 laterally extending outlet ports 148, the flow of the air and oil is further retarded, so that any oil which is conveyed by the air through the device is not squirted upwardly but gravitates downwardly on to the adjacent parts where it can be easily wiped up.

From the foregoing description, it will be noted that I have provided an apparatus wherein the work automatically controls the operation of moving the die and cutter therewith, and the operation of the cutter or cutters, and at the same time I provide a connection between the work engaging device and the cutter or cutters, whereby they move as a unit, so that the sections are successively cut to predetermined, uniform lengths; also, that I provide a spring operated power mechanism which gives a quick impulse to the operating shaft, and serves to accelerate its speed and a separate power mechanism which is automatically connected to the operating shaft and initially supplements the rotative effort of the spring operated mechanism, then applies its power to continue rotating the shaft, whereby the cutter or cutters are operated, and finally re-sets the spring of the spring operated power mechanism, following which the separate power mechanism is disconnected from the shaft and the latter is automatically locked against rotation ready for the succeeding cutting operation. In this co-ordinated application of power, strain on the separate power mechanism when it becomes connected to the operating shaft is entirely eliminated.

It will also be noted that the die is yieldingly connected to its reciprocating mechanism, so that the work engaging device, die and cutter or cutters may be moved by the work and relative to the die reciprocating mechanism to effect operation of the latter.

No claim is made herein to the subjects-matter of my co-pending applications Serial Numbers 710,430 (see Letters Patent No. 2,155,396, dated April 25, 1939) and 150,697.

To those skilled in the art to which my invention relates, many changes in construction and widely differing embodiments and applications of the invention will suggest themselves without departing from the spirit and scope of my invention. The disclosures and the description herein are purely illustrative and are not intended to be in any sense limiting.

What I claim is:

1. In apparatus of the class described, the combination of a table mounted to reciprocate parallel to the direction of feed of the work, a die mounted to slide on said table parallel to the direction in which said table reciprocates, yieldable connections between said die and table normally tending to maintain said die in a predetermined position relative thereto, means for feeding work to said die, means for reciprocating said table, a cutter having fixed relation with said die for movement therewith, means operatively connected to said cutter for moving it toward and from the work, a flag connected to said die and arranged to be engaged and moved by the work whereby said die and cutter move with the work relative to said table, and means controlled by the movement of said flag for operating said reciproctaing means and said cutter moving means.

2. An apparatus as claimed in claim 1 wherein the last mentioned means is arranged to operate said reciprocating means in advance of said cutter moving means.

3. In apparatus of the class described, the combination of a reciprocatable table, a die slidable thereon, yieldable connections between said die and table, means for feeding work to said die, means for reciprocating said table, a cutter having fixed relation with said die for movement therewith, means operatively connected to said cutter for moving it toward and from the work, a flag arranged to be engaged and moved by the work and connected to said die, and means controlled by the movement of said flag for operating said reciprocating means and said cutter moving means, said control means including cylinders each connected with a fluid supply under pressure and provided with pistons releasably connected to said reciprocating means and said cutter moving means, a valve in said fluid supply and common to the fluid connections to said cylinders and a pressure valve in the fluid connection to the cylinder for the piston connected to said cutter moving means arranged to admit the fluid to said cylinder after the piston in the other cylinder has been operated.

4. In apparatus of the class described, the combination of a table mounted to reciprocate parallel to the direction of feed of the work, a die mounted to slide on said table parallel to the direction in which said table reciprocates, yieldable connections between said die and table normally tending to maintain said die in a predetermined position relative thereto, means for feeding work to said die, means for reciprocating said table, a slide reciprocatable at right angles to the feed of the work, means for reciprocating said slide, a cutter mounted on said slide to move in the direction of feed of the work and arranged to be moved toward and from the work by said slide, connections between said cutter and die, whereby they have fixed relation during movement of said die and said slide, and means for controlling the operation of each of said reciprocating means, said controlling means including a device connected to said die and arranged to be engaged and moved by the work.

5. In apparatus of the class described, the combination with a frame and means for feeding work to be cut into sections, of a die mounted to reciprocate on said frame in line with the feed of the work, a slide mounted on said frame to reciprocate at substantially right angles to the feed of the work, a flag movably mounted on said frame in the path of movement of the work and arranged to be engaged and moved thereby, a cutter slidably mounted on said slide and connected to said die to move therewith, conditions between said flag and die whereby the latter and said cutter move as a unit with said flag, means for reciprocating said slide and cutter, a reciprocating member operatively connected with said die, and power means connected with said member and arranged to move said member with the die during movement thereof with the work and to return the die, cutter and flag to starting position in co-ordinated relation with the movement of the cutter to cut the work.

6. An apparatus as claimed in claim 5 wherein the power means is controlled by the movement of said flag.

7. An apparatus as claimed in claim 5 wherein means are provided for operating the flag out of engagement with the work during movement thereof and following each cutoff operation and then into engagement with the cutoff section of the work to discharge it.

8. In a cutoff mechanism, means for feeding preformed work rectilineally, a pair of cutters mounted to move toward and from the work at angles to each other, means for reciprocating said cutters in co-ordinated relation whereby one cutter makes its cutting stroke in advance of the cutting stroke of the other cutter, and means for reciprocating the cutters in a direction parallel to the direction of movement of the work relative to and during operation in one direction of the first mentioned reciprocating means.

9. In a cutoff mechanism, means for feeding preformed work rectilineally, a pair of cutters mounted to move toward and from the work at angles to each other, one cutter being provided with spaced cutting edges arranged to slot opposite portions of the work and the other cutter being arranged to project through the slots and cut the remaining portions of the work, means for reciprocating said cutters in co-ordinated relation whereby one cutter makes its cutting stroke in advance of the cutting stroke of the other cutter, and means for reciprocating the cutters in a direction parallel to the direction of movement of the work relative to and during operation of the first mentioned reciprocating means.

10. In a cutoff mechanism, the combination of means for feeding preformed work rectilineally, a pair of cutters disposed in the same plane transverse to the direction of movement of the work, means for reciprocating the cutters in said transverse plane in co-ordinated relation whereby one cutter makes its cutting stroke in advance of the cutting stroke of the other cutter, and means for reciprocating the cutters in a direction parallel to the direction of movement of the work, relative to said first mentioned reciprocating means.

11. In a cutoff mechanism, the combination of means for feeding preformed work rectilineally, a pair of cutters disposed in the same plane transverse to the direction of movement of the work, a shaft, means operated by said shaft for reciprocating the cutters in said transverse plane in co-ordinated relation whereby one cutter makes its cutting stroke in advance of the cutting stroke of the other cutter, means for reciprocating the cutters in a direction parallel to the direction of movement of the work relative to said first mentioned reciprocating means, and means for controlling the rotation of said shaft.

12. In a cutoff mechanism, means for feeding preformed work rectilineally, a pair of cutters mounted to move toward and from the work at angles to each other, means for reciprocating said cutters in co-ordinated relation whereby one cutter makes its cutting stroke in advance of the cutting stroke of the other cutter, and means for reciprocating the cutters in a direction parallel to the direction of movement of the work relative to and during operation of the first mentioned reciprocating means, the last said cutter reciprocating means including a device operatively connected to said cutters and arranged to be engaged by and moved with the work to control the movement of the cutters therewith.

13. In a cutoff mechanism, means for feeding preformed work rectilineally, a pair of cutters mounted to move toward and from the work at angles to each other, a shaft, power means for rotating said shaft, means for starting and stopping the rotation of said shaft, means connected with said shaft for reciprocating said cutters in co-ordinated relation whereby one cutter makes its cutting stroke in advance of the cutting stroke of the other cutter, and means for reciprocating the cutters in a direction parallel to the direction of movement of the work relative to and during operation of the first mentioned reciprocating means, the last said cutter reciprocating means including a device operatively connected to said cutters and arranged to be engaged by and moved with the work to control the movement of the cutters therewith, said device serving to control the said starting and stopping means.

14. In a cutoff mechanism, the combination with a frame, of means for feeding work to be cut into sections, a shaft mounted in said frame, a die slidably mounted on said frame to reciprocate in line with the work, a cutter slidably mounted on said frame and operated by said shaft toward and from the work, means for locking said shaft against rotation in a predetermined position and releasing it, a spring operated power mechanism connected to said shaft and arranged to start the rotation thereof when said shaft is released, a separate power mechanism, a clutch arranged to automatically connect said separate power mechanism to said shaft, when the latter rotates a predetermined distance, to operate said cutter and compress said spring and automatically disconnect said mechanism from said shaft in further rotation of said shaft to a predetermined position, means for reciprocating said die, driving mechanism independent of said spring operated power mechanism for operating said die reciprocating means, means actuated by the work for connecting said driving mechanism to said reciprocating means and for operating said locking means to release said shaft, the elements of said locking means being arranged to return to locking position during one revolution of said shaft, and to lock it in said predetermined position under the influence of said spring operated power mechanism, and a device carried by said frame for controlling the operation of said clutch.

15. A mechanism as claimed in claim 14 wherein said work actuated means is arranged to connect said driving mechanism to said reciprocating means in advance of the release of said locking means.

16. In a cutoff mechanism, the combination with a frame, of means for feeding preformed work rectilineally, a die for the work mounted on said frame, slides mounted on said frame to reciprocate in a plane transverse to the feed of the work but in directions at an angle to each other, cutters carried by said slides, one arranged to engage and cut opposite portions of the work and the other arranged to engage and cut the remaining portions of the work, a shaft, operating connections between said shaft and said slides, and means controlled by the feed of the work for operating said shaft.

17. In a cutoff mechanism, the combination with a frame, of means for feeding preformed work rectilineally, a die slidably mounted on said frame to reciprocate in line with the work, slides mounted on said frame to reciprocate in a plane transverse to the feed of the work but in directions at an angle to each other, cutters slidably mounted on said slides and connected to said die for movement therewith, means for operating said slides in co-ordinated relation whereby one cutter makes its cutting stroke in advance of the cutting stroke of the other cutter, a device arranged to be engaged and moved by the work and connected to said die, whereby the latter and said cutters move with the work in one direction, reciprocatable means connected to and co-ordinated with the movement of the die with the work for returning said die, cutters and work engaging device, and means actuated by said work engaging device for controlling the movement of said die reciprocatable means and said slide operating means.

18. In apparatus of the class described, the combination of a die, means for feeding work to said die, a cutter for cutting the work into sections, a shaft, means operatively connecting said shaft to said cutter for moving the latter toward and from the work, co-ordinated spring operated and main power mechanisms for rotating said shaft and compressing the spring of said spring operated power mechanism, releasable means for stopping said shaft at a predetermined position following the compression of said spring, a flag arranged to be engaged and moved by the work for controlling said stopping and releasing means, and means for retarding the rotation of said shaft prior to the stopping of said shaft by said releasable means.

19. In apparatus of the class described, the combination of a die, means for continuously feeding work to said die, a cutter movable toward and from the work, a shaft operatively connected to said cutter for operating it, means including power mechanism and releasable elements for controlling said mechanism whereby said shaft makes one revolution to effect a cutting operation and stops at a predetermined position, means actuated by the work for operating said releasable elements, and means for retarding the rotation of said shaft as it approaches the end of each revolution.

20. In a cutoff mechanism, means for feeding preformed work rectilineally, a pair of cutters mounted to move toward and from the work at angles to each other, means for reciprocating said cutters in co-ordinated relation whereby one cutter makes its cutting stroke in advance of the cutting stroke of the other cutter, a device disposed in the path of movement of the work and arranged to be moved thereby, and operatively connected to said cutters whereby they move in one direction with the work, and means for moving the cutters and said device in the opposite direction.

21. In a cutoff mechanism, means for feeding preformed work rectilineally, a pair of cutters disposed in the same transverse plane and mounted to move toward and from the work at angles to each other, a die mounted to move with the work during the cutting strokes of said cutters, operating connections between said cutters and said die, whereby said cutters move with said die, means for reciprocating said cutters in co-ordinated relation whereby one cutter makes its cutting stroke in advance of the cutting stroke of the other cutter, a device disposed in the path of movement of the work and arranged to be moved thereby and connected to said die, whereby said die and cutters move in one direction with the work, and means for moving the die and device in the opposite direction.

22. A mechanism as claimed in claim 20, wherein the operation of the last said means is controlled by the movement of said device by the work.

23. The method of cutting cylindrical pipe comprising cutting a portion of the wall of the pipe substantially along a chord of the outer periphery of the pipe by a cutting force initiated from a point on the surface of the pipe intersected by the chord, and then cutting across the pipe by a cutting force initiated at the first cut in a direction at an angle to the chord.

24. The method of cutting cylindrical pipe comprising cutting a portion of the wall of the pipe substantially along a chord of the outer periphery of the pipe by a cutting force from an initial point on the surface of the pipe to a point on the chord designated by the intersection of the chord with a diameter of the pipe at an angle to said chord, and then cutting the pipe by a cutting force in the direction of that diameter.

25. The method of cutting a longitudinal tubular member, comprising cutting a portion of the wall of the member in a direction generally tangentially of the periphery of the member, and then cutting across the member by a cutting force initiated at the first cut portion and applied at an angle to the first direction for cutting across the member.

26. Apparatus for cutting cylindrical pipe, comprising cutting means movable transversely of the pipe for cutting a portion of the wall of the pipe substantially along a chord of the outer surface of the pipe initiated from a point on the surface of the pipe intersected by the chord, and means movable with respect to the pipe in a direction at an angle to and initiated at the chord for cutting across the pipe.

27. Apparatus for cutting a longitudinal tubular member, comprising cutting means movable generally tangentially of the periphery of the member for cutting a wall portion of the member, and means movable with respect to and across the member in a direction at an angle to the first direction for cutting across the member.

28. The method of cutting a cylindrical pipe comprising cutting diametrically opposed wall portions of the pipe respectively along two parallel chords of the outer periphery of the pipe, each of a length less than the diameter of the pipe, by cutting forces initiated respectively at points on the surface of the pipe intersected by the chords, and then cutting across the pipe by cutting force initiated at a point in one of the first cuts and at an angle to the chords.

29. The method of cutting a cylindrical pipe comprising cutting diametrically opposed wall portions of the pipe respectively along two parallel chords of the outer periphery of the pipe by cutting forces initiated respectively at points on the surface of the pipe, each chord being spaced inwardly from the adjacent surface portion of the pipe a distance slightly greater than the thickness of the pipe wall, and then cutting across the pipe by cutting force initiated at a point in one of the first cuts and at an angle to the chords.

30. The method of cutting a longitudinal tubular member comprising cutting opposed wall portions thereof by cutting forces initiated respectively at transversely spaced points on the outer surface of the member and proceeding along parallel cutting lines through the member to cut out opposed wall portions, and then cutting across the member by cutting force initiated at one of the first cuts and applied at an angle to the direction of the aforesaid cutting lines.

31. The method of cutting a longitudinal tubular member comprising cutting transversely opposite wall portions of the member along transversely spaced, substantially parallel lines lying in a plane passed transversely through the pipe by cutting forces initiated respectively at points on the surface of the member intersected by said lines, and then cutting across the pipe by cutting force initiated at a point in one of the first cuts and at an angle to the aforesaid lines.

32. The method of cutting a cylindrical pipe comprising shearing a pair of diametrically opposed segments from the wall of the pipe by shearing force transversely of the pipe and then shearing the remaining wall portions by shearing force applied at an angle to the first shearing force and in the same plane.

ALEXANDER BORZYM.